United States Patent [19]

De Vito

[11] 3,832,535

[45] Aug. 27, 1974

[54] DIGITAL WORD GENERATING AND RECEIVING APPARATUS

[75] Inventor: Louis De Vito, Jersey City, N.J.

[73] Assignee: Instrumentation Engineering, Inc., Franklin Lakes, N.J.

[22] Filed: Oct. 25, 1972

[21] Appl. No.: 300,536

[52] U.S. Cl.......... 235/153 AC, 324/51, 324/73 AT

[51] Int. Cl............................................. G06f 15/20

[58] Field of Search. 235/151.31, 153 AC, 153 AK; 324/51, 73 R, 73 AT, 73 PC; 340/248 R, 248 A, 248 B, 248 C, 248 P

[56] References Cited

UNITED STATES PATENTS

| | | | |
|---|---|---|---|
| 3,546,582 | 12/1970 | Barnard et al. | 324/51 X |
| 3,581,074 | 5/1971 | Waltz | 235/153 AC |

*Primary Examiner*—Malcolm A. Morrison
*Assistant Examiner*—R. Stephen Dildine, Jr.
*Attorney, Agent, or Firm*—Morgan, Finnegan, Durham & Pine

[57] ABSTRACT

Apparatus for generating and receiving, for analysis, multibit digital words applied to or received from an electronic circuit under test in response to a computer command. A multibit data register capable of being loaded with data from the computer is controlled by a variable frequency clock signal to apply bits of the data pattern to the circuit under test. In the receive mode, the data bits are applied to a logic comparator which receives also signals from the unit under test, and any discrepancies in the incoming signal pattern or level are stored in an error register for later read-out.

34 Claims, 5 Drawing Figures

DIGITAL WORD GENERATING AND RECEIVING APPARATUS

FIELD OF THE INVENTION

This invention relates to apparatus for generating and/or processing multibit digital words and, in a preferred system, to to apparatus suitable for use with a digital computer which generates, analyzes or both generates and analyzes a sequential bit pattern at one or more test points in an automated diagnostic testing system.

BACKGROUND OF THE INVENTION

Many complex electrical circuits contain logic components which must respond to a variety of input voltage levels and waveforms. For example, logic elements often must have the capability of operating at a variety of pulse frequencies and should demonstrate satisfactory operating characteristics even with applied pulse waveforms having some degree of waveshape and level deterioration. Great numbers of these logic components forming parts of a complex system are usually found on a single printed circuit board and it is desireable to be able to check automatically all of these components for acceptable dynamic and static performances at a single test station and without having to move the board between several test stations each of which performs only a limited test. With the present invention full logic testing through generation and analysis of digital patterns is possible.

In order to attain a thorough test of logic circuits, any testing apparatus must have the capability of applying a test signal to the various points and terminals of the logic circuits in not only different digital parallel word bit patterns but in different serial word or bit sequences and, perhaps, at different rates of application of those digital words. No known test generating apparatus has heretofore had such a capability.

The generation of digital bit patterns or words for application to a circuit under test has been accomplished prior to the present invention. It is believed that all known systems, to the extent that they are automated, rely on the computer memory and logic for developing the applied words. In such cases the testing of electronic circuits is severely hampered by the capacity and speed of the digital computer controlling the operations. Thus, a digital word cannot be generated or processed in a time which is shorter than the cycle time for the computer itself. If, for example, a digital word is generated on the input/output bus of the computer for application to the circuit under test, the computer must wait for responses from the circuit before proceeding with an analysis of the signals. Furthermore, digital words cannot be applied to the circuit under test at a faster rate than the access time to the computer memory. As a result of these limitations, tests cannot be performed on high frequency, fast-response circuits whose operating frequencies are significantly higher (faster) than the computer's access times. Furthermore, when the computer itself is used as a digital word generator, word generation rates are slaved to the computer cycle times.

A second shortcoming of prior art devices has been their inability to vary or detect different signal voltage levels. If a computer alone were used without external equipment to generate the digital signal, for example, a received or generated signal may well lie outside acceptable signal levels for the computer. The prior art also is deficient in providing for sequential generation of parallel word patterns and, in general, lacks the versatility that has always been required but which before this has been met piecemeal by segregating testing procedures and obtaining only partial results during any given test.

It is therefore one object of the present invention to overcome the limitations of the methods of the prior art for generating and analyzing digital words for testing and other purposes.

Another object of the invention is to provide a versatile digital word generator that is capable of performing full functional tests on both a static and a dynamic basis.

A further object of the invention is to provide a word generating apparatus for developing digital words having different bit patterns for rapid sequential application to the circuit under test.

Still another object of the invention is to provide a digital word generator for operation in conjunction with a digital computer but whose word generation and analyzing capabilities are essentially independent of the computer so as to require minimum access to the computer and only modest memory space.

SUMMARY OF THE INVENTION

In brief, the foregoing and other objects of one aspect of the invention are attained in a digital word generator including a multibit memory independent of the computer memory for storing the bits of a digital signal pattern, and a signal source producing a clock signal having a frequency selectively different from the cycle time of the computer for operating the local memory to produce the bits and the bit pattern in a predetermined sequence at the memory output.

In the preferred embodiment, the local memory comprises a multistage shift register whereby the pulses from the clock sequentially shift a prestored bit pattern through the register for sequential application to the circuit under test. Use of this type of memory does not require, and is considerably faster than, random access or other types of addressable memory devices. There is one such register for each circuit point to receive a bit, and an eight-bit digital parallel word to be applied simultaneously to eight separate test points therefore would employ eight such registers.

Another aspect of the invention resides in the receipt and analysis of memory signals. Broadly, the receiver incorporates a logic comparator for comparing the responses gotten from the circuit under test with an expected bit pattern stored in the local register. The output of the logic comparator in this case may be sampled at selected times delayed from the clock pulse source and applied to an error register which then stores an error indication for each bit position of a sequence of bits received from a particular circuit point.

Because a separate register is used for each test point connectable to the circuit under test, digital words may be applied during the test in either parallel or serial form and, because the clock signal operating the shift register may be independent of the computer, as may be the shift register, testing is possible while the digital computer performs yet other functions unrelated to the control of the specific testing operation in progress. At the conclusion of the test, the contents of the error register can be sampled by the computer to determine whether any errors occurred and, if so, at which test points and in which particular bit positions of each word.

The accompanying detailed description should be consulted for a complete understanding of the invention, together with its several advantages, capabilities and operational characteristics.

DETAILED DESCRIPTION OF THE PREFERRED EMBODIMENT

Figure 1:
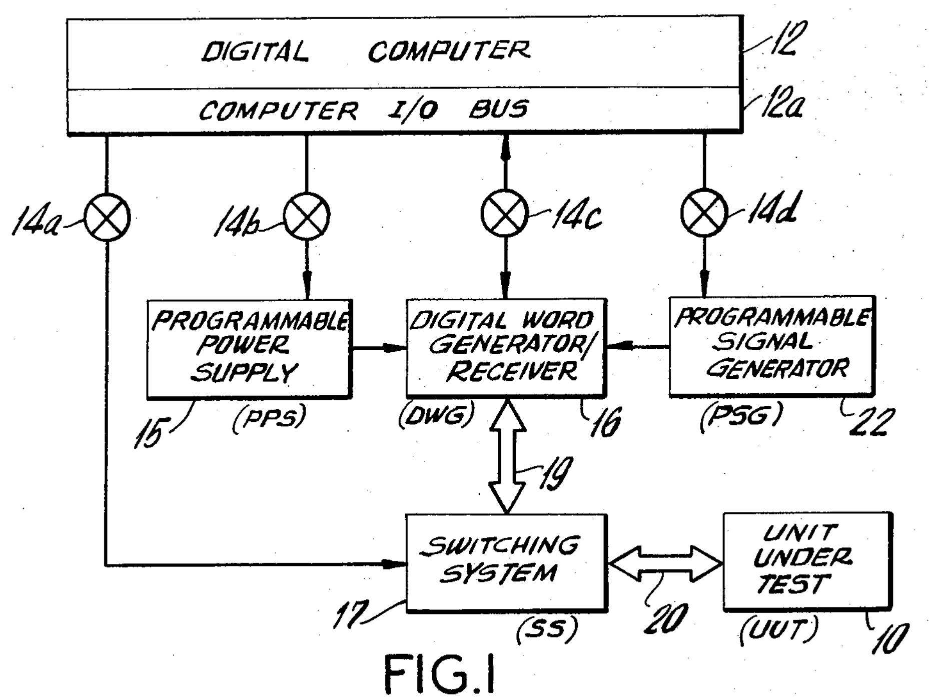
FIG. 1 is a schematic block diagram of the invention in the environment of a computer-controlled diagnostic testing system.

The general use of the invention in a computer-controlled testing system is best appreciated from FIG. 1. In this system it is assumed that an electronic circuit (unit) under test 10 must undergo tests for correct operation of the logic elements contained in this unit. Typically, the unit under test (UUT) is a printed circuit board containing tens, hundreds or even thousands of circuit components and having perhaps 100 points of connection for signals flowing to and from the circuit board. These points of connection are brought out to a connector at the edge of the board which slips into a test connector (not shown) comprising part of the test equipment. A complete testing system including a detailed description of a switching system by which test points associated with peripheral testing devices (such as the digital word generator/receiver of the present invention) may be connected to points on the UUT itself, is described in the co-pending application of Ernest H. Ehling et al. entitled "Computerized Diagnostic Test System," Ser. No. 153,902, filed June 15, 1971 and assigned to the assignee of the present invention.

Control of the test functions in the FIG. 1 system is brought about under control of a modern small-scale digital computer 12, such as the "INTERDATA 4" or a similar type. Signals produced by the digital computer appear at the computer input/output (I/O) bus 12*a* and, in the system depicted in FIG. 1, are used to control various devices which may be needed during a particular functional test. There may be many such peripheral devices, including various signal generators, voltmeters and power supplies; however, only those pertaining to the present invention are illustrated in FIG. 1.

In a manner well understood by those skilled in the art, control and data signals appear on the computer I/O bus in the form of bytes of information. Thus, eight parallel bits comprising one byte appear on the parallel conductors of the computer I/O bus for controlling the testing operation automatically. The computer communicates with the peripheral devices, including the DWG/R, through device controllers 14*a*, 14*b*, 14*c* and 14*d*. These controllers accept information from the I/O bus when addressed and may themselves include temporary data buffers for storing information representing a control function for the peripheral device so that, once the device controller has received data from the computer, it may thereafter continue to operate although no longer addressed and receiving data from the computer. For example, in the case of the programable power supply (PPS) 15, the supply may be directed to produce an output voltage of 3.5 volts and then instructed to be operated upon a single future command without further communication with the computer. It will then continue to operate as set. Various types of device controllers are known in the art and require no elaboration here except to say that each device controller depends upon the form of data supplied by the particular computer and its limitations. The controllers can thus assume many different forms which do not concern the invention.

In accordance with the invention, the digital word generator/receiver (DWG/DWR) 16, upon receiving instructions from the computer via its device controller 14*c*, generates digital words that have a digital bit pattern which may be composed by the operator. This digital bit pattern can be applied simultaneously, as in the case of a parallel bit word, or sequentially, to virtually every pin or test point of the UUT. This data is applied to the UUT via the switching system 17. Alternately the signals from DWG/DWR may be applied directly to the pins of the UUT. The broad arrows 19, 20 interconnecting the DWG/DWR 16 and UUT 10 with the switching system 17 designate a multi-conductor bus which may include as many conductors as test points. The switching system is under control of the device controller 14*a* which, when addressed, enables the switching system 17 to make the required connections between the device 16 and the UUT 10 in a manner described in the above U.S. application Ser. No. 153,902.

The device 16 receives variable voltages from the programable power supply 15 used for selecting the amplitude levels for the signals to be applied to the UUT and for predesignating those signal levels which are deemed acceptable in the received signal. Pulse signals from a programable signal generator (PSG 22) having a special relationship to the device 16 are also applied. Specifically, the generator 22 develops the pulse signals which determine the rate at which digital bit patterns are applied to the UUT and, also, the rate at which responses of the UUT to such signals are read or sampled.

In summary, and as applied to the present invention, the DWG portion of the device 16 receives variable voltage levels from the PPS 15 and clocking function signals from PSG 22, and internally applies to the UUT 10 stored digital bit patterns formulated by the operator. Similarly the DWR portion of the device analyzes the incoming digital bit pattern for correctness and level tolerance by comparing a stored pattern with the one received. The manner in which these functions are accomplished will now be described.

Figure 2:
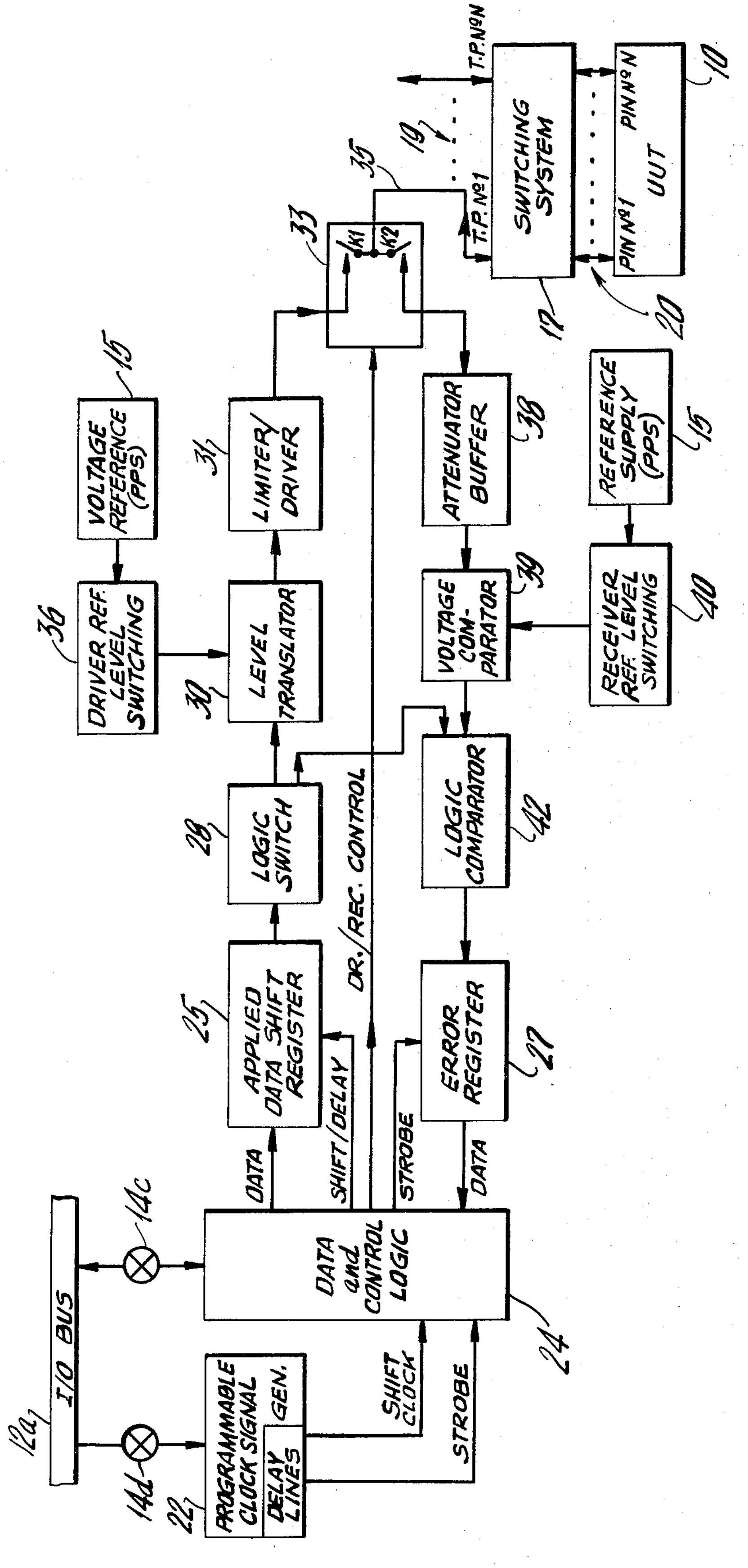
FIG. 2 is a schematic block diagram of a digital word generator/receiver in accordance with the invention.

FIG. 2 represents in block diagram form the fundamental elements of DWG/DWR 16, operating in conjunction with PSG 22, the switching system 17 and UUT 10, for generating a sequential bit pattern for application to one test point, or one pin, associated with the UUT, and also for receiving and analyzing a sequential digital bit pattern received at a test point. As mentioned earlier, the device is capable of the dual function of not only generating a sequential bit pattern, but also of receiving and analyzing a sequential bit pattern generated in response, for example, to a digital bit pattern or patterns applied to other pins or test points. In the descriptions which follow, the apparatus and operation associated with a single test point is explained, but the same principles and operation do apply to the remaining test points in the system, as well. If, for example, it is desired to be able to apply a sequence of bits to 100 separate pins of the UUT, or to receive data from selected ones of those pins, there will exist 100 generator and receiver channels as illustrated in FIG. 2 for the entire digital word generator/receiver.

Referring to FIG. 2, the device 16 upon receiving computer commands from the device controller 14*c* develops data and control signals within the section 24 (illustrated in more detail in FIG. 5), the latter receiving timing and control signals from PSG 22, as illustrated. Fundamentally, these timing signals comprise clock pulses for shifting data through the register 25, and for registering data in an error register 27 in those cases in which the device 16 is in the "receive" mode. Register 25 stores data, i.e., a particular bit pattern, which represents either (a) a bit pattern to be applied to an output test point or (b) a bit pattern which is expected to be received from that test point in response to some stimulus of the UUT. That bit pattern is composed by the operator and is entered into the device 16 from the computer where it is retained for use upon command from the computer.

Considering first the case in which the DWG/DWR operates as a digital word generator, data from the register 25 passes through a logic switch 28, from there through a level translator 30 which adjusts the amplitude of the output signal, and then to a limiter/driver 31 to prepare the signal for application to the test point. A switch 33 including relays K1 and K2 connects the output conductor 35 to either the generator channel (just described) when the relay K1 is energized, or to the receiver channel when the relay K2 is energized. Amplitude levels of the output signal are adjusted by means of the level switching unit 36, the details of which appear in FIG. 4.

In the "receive" mode, signals on the conductor 35 are applied to an attenuator/buffer unit 38, and from there to a voltage comparator 39 which determines whether the amplitude of the incoming signal is within preselected limits set by the reference level switching unit 40.

If the received signal is, first of all, within the desired range, appropriate signals are directed to a logic comparator 42. Here, the output of the voltage comparator 39 is directly compared for identical logic with the output of register 25, because the logic switch 28 directs the local register 25 output to the comparator in this mode.

Logic comparator 42 makes a bit-by-bit comparison of the incoming digital bit pattern with the expected digital bit pattern (i.e., the desired digital bit pattern) which has been previously sotred in register 25. It is apparent, therefore, that the output of logic comparator 42 is an error indication which, if present, is stored in register 27.

Summarizing briefly the operation of FIG. 2, data is loaded into register 25. This data represents either data to be applied to the test point or data which is expected to be received from that test point. Desired levels of amplitude for the generated signal or for the received signal are set by the units 36, 40. In the "drive" mode, the relay K1 is closed and the digital bit pattern is applied to the UUT. In the "receive" mode, the relay K2 is closed and signals at the output of the UUT are applied to the reception channel of the device where, in units 39 and 42, voltage and logic comparisons are made. If these comparison operations result in an error indication, this indication is stored in register 27 and may be read out of this register at an appropriate future time during trouble analysis.

Certain advantages of the invention may already be appreciated. First, the system of FIG. 2 is capable of providing full functional testing of the digital circuit. It can test for the presence or absence of a digital signal at a particular instant of time, it can apply and test for proper voltage levels, and it may generate an infinite variety of digital word patterns by selection of the data stored in the data register. Equally importantly, the system operates independently of the computer once data has been loaded into the register because data may be shifted out of the register at any desired rate compatible with the limitations of the unit under test and the system itself. It is not dependent upon access times of the computer itself and, as a general rule, operates considerably faster than the computer. By the same token, if a unit under test is expected to provide unusually slow responses i.e., long delays between the application of the signal or a stimulus to the unit and the reception of a response from it, valuable computer cycles need not be wasted while waiting for this response. Furthermore, in the receive mode, automatic analysis of a received signal is carried out and any errors are stored for read-out at any time during a problem analysis.

Figure 4:
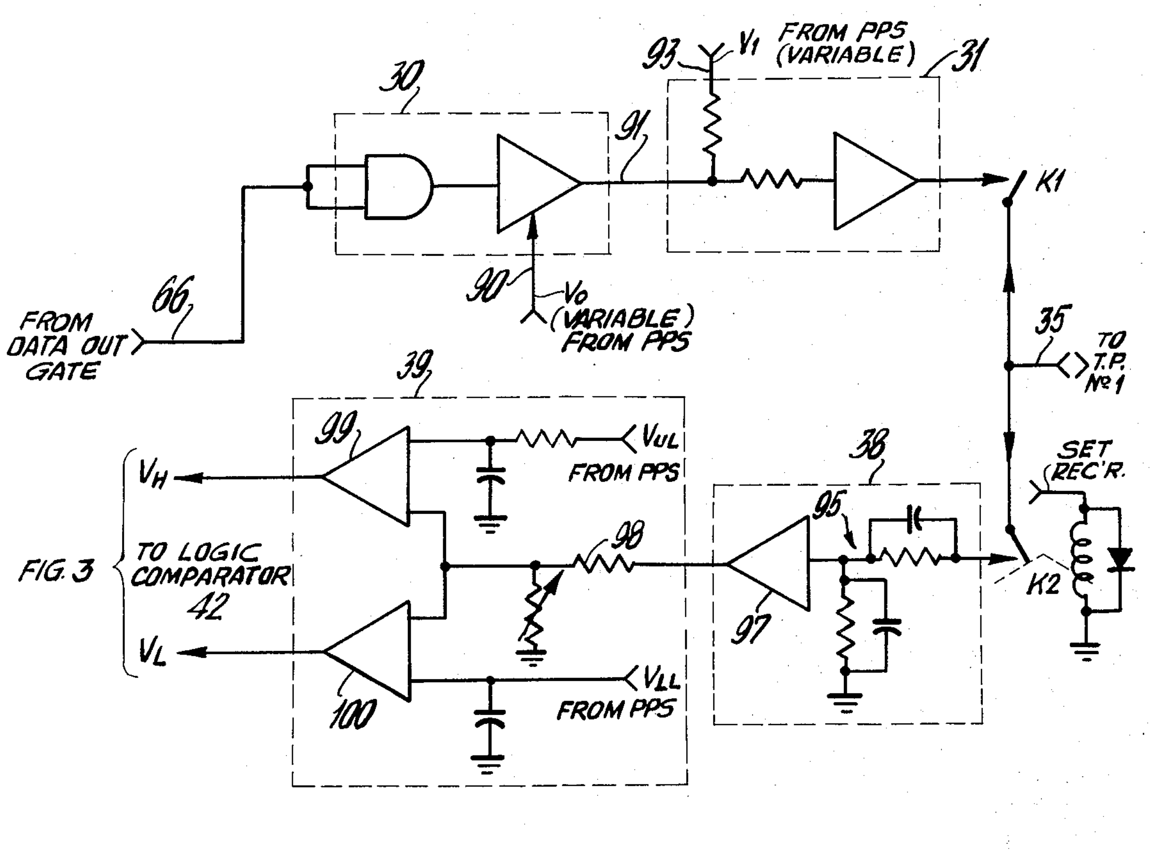
FIG. 4 is a schematic circuit diagram of those portions of the FIG. 3 system associated with signal level control.
Figure 3:
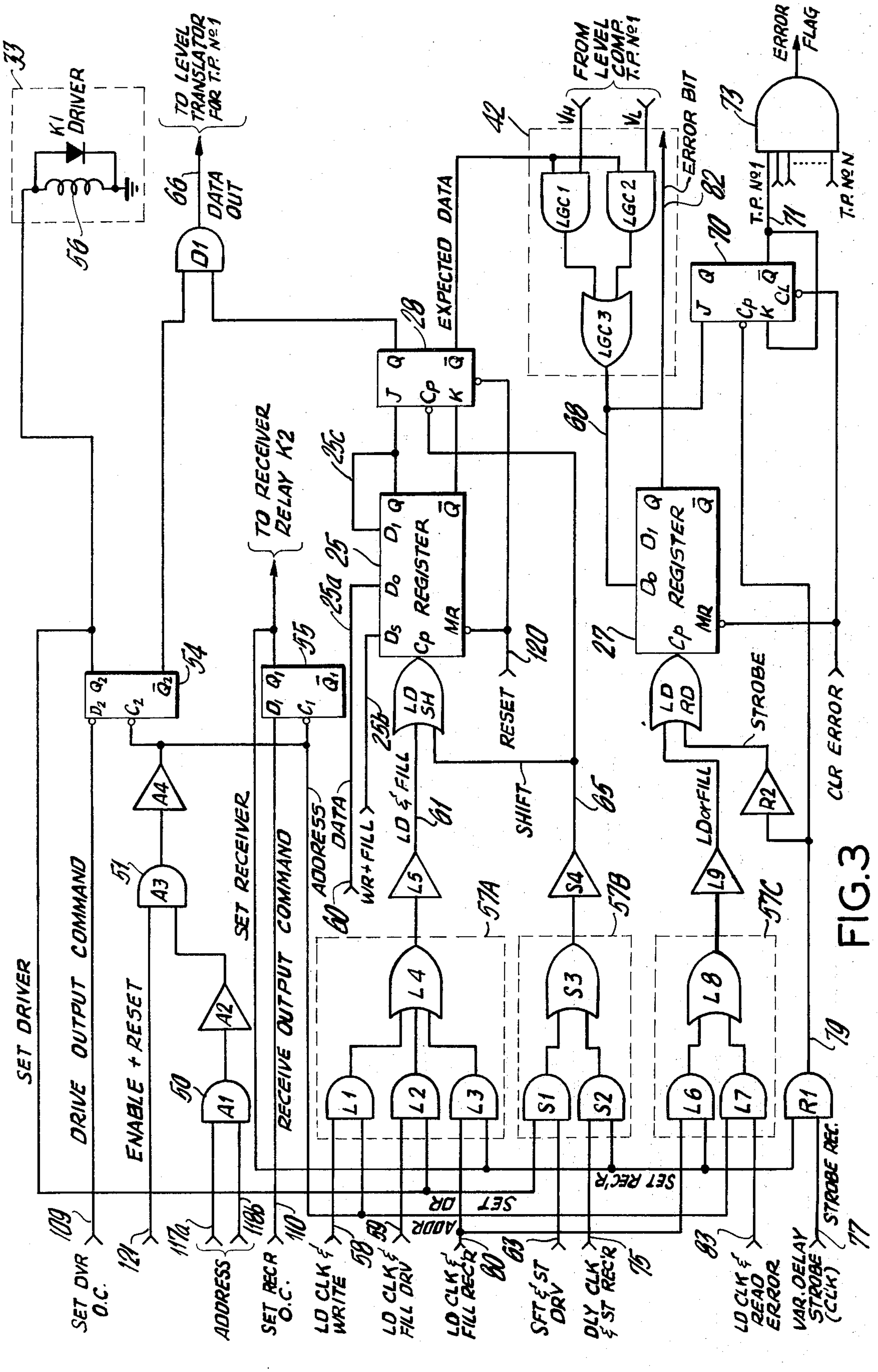
FIG. 3 is a more detailed circuit schematic diagram of the primary signal producing elements depicted in FIG. 2.
Figure 5:
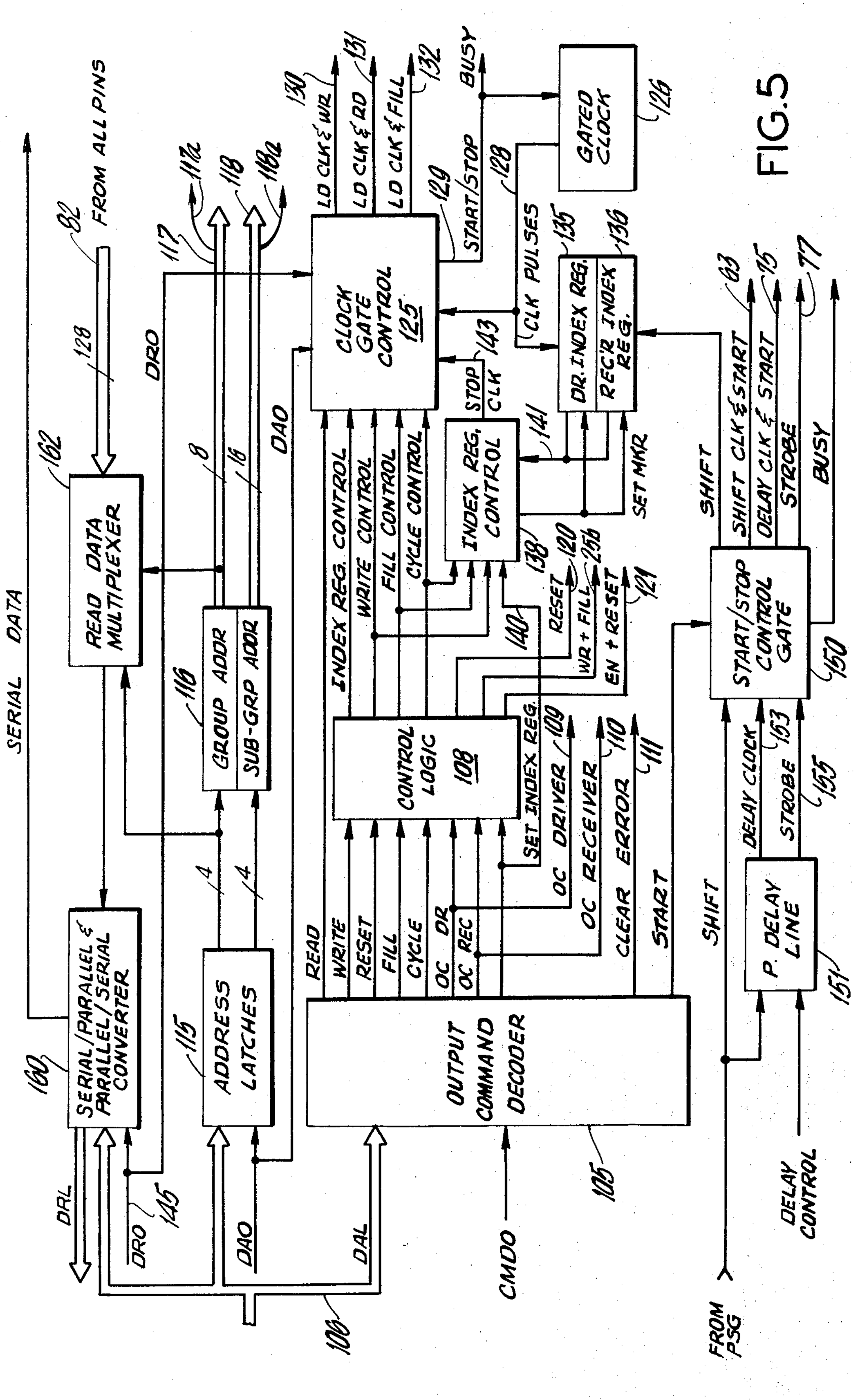
FIG. 5 is a schematic block diagram of the data and control logic portions of the FIG. 2 system.

Reference to FIGS. 3–5 will be helpful in understanding the precise manner in which all the foregoing is accomplished.

In order to select a particular test point to which a bit pattern is to be applied or from which it is to be received, an address is generated by the computer 12. This address is processed by the device sub-controller (FIG. 5) and activates both input lines to the A1 (A=ADDRESS) gate 50 at the same time a signal is applied to enable the gate 51 to clock and thereby to set one of two FLIP-FLOPS 54, 55. If the system is to operate in the "drive" or excite mode, a signal will appear at the input to the FLIP-FLOP 54, thus setting the output of this device and energizing the coil 56 of the driver relay K1. The output signal from the FLIP-FLOP 54 also is applied to gates L2 (L=LOAD) and S1 (S=SHIFT) of the logic control sections 57A and 57B, which are adjuncts to control of the register 25.

If the system is to operate in the receive mode, the output of the FLIP-FLOP 55 instead is high, and this signal is applied to the and gates L3, S2, and L6, the latter being in section 57C, as well as to the and gate R1 (R=RECEIVE). The driver FLIP-FLOP 54 is set by a "drive output command," whereas the receiver FLIP-FLOP 55 is activated by a "receive output command," in either case only that particular test point is addressed (gates A1–A4 true).

As mentioned earlier, register 25 is loaded with a bit pattern to be applied to a test point in the DRIVE mode and is loaded with data expected to be received from the test point in the RECEIVE mode. In either case, it is required that the largest number of bits that are to be applied in sequence to any test point, or to be received from any test point, be known beforehand. If the number of bits present in the largest sequence is less than the capacity of the multi-bit shift register 25, then data must be moved through the shift register by a number of stages which is equal to the difference between the capacity of the register and the largest number of data bits.

Data is written, i.e., stored, in register 25 in the following manner. During the writing of computer data to this register, the data appears on the register input conductor 25*a* and a signal is impressed on the register control conductor 25*b* to operate the register in a manner such that it accepts the bits on the conductor 25*a*, rather than any data on the conductor 25*c* recirculated from the Q output of the register. During normal operation of the register when the system is operating, there will be no command on the conductor 25*b* so that data recirculates from the output of the register back to its input via the connection 25*c*.

As bits of information appear at either of the two inputs to the register, they must be clocked bit-by-bit through the various register stages so that they will appear in proper sequential order at the output of the register. During the writing of data to the register, load clock pulses at the input 58 to the gate L1 are present. Since the SET and ADDRESS lines are high, this results in logical activation of the OR gate L4 and the inverter L5, producing load clock pulses at the pulse rate at the input to the register 25. Once the writing operation has been completed, it is then necessary to advance the data forward so that the first bit is in the first (right-most) position in the register, and this is done by a command (FILL DRIVER) at the input 59 in gate L2. This command is in the form of load clock pulses which continue until the data has moved forward by the desired number of stages. During this period of time, no data is present on the input conductor 25*a* so that 0's are "filled in" behind the data already written in.

Data is moved out of the register 25 under a suitable command, whereupon shift pulses appear at the input 63 to the shift gate S1. Of course, the gates S–1 – S–3 will be enabled by reason of the SET and ADDRESS lines being true whenever this particular test point is addressed. When the system is in the "receive" mode, shift pulses (which are initiated by the programmable signal generator 22) applied to the input 63 appear on the conductor 65. This results in stored data being shifted out of the register 25, one bit for each shift pulse. Each pulse is presented to the input of the logic FLIP-FLOP 28. The FLIP-FLOP 28 operates is a manner such that a true (1) input to the J terminal will result in a 1 output of the FLIP-FLOP. The opposite condition occurs if the input to the FLIP-FLOP is a 0.

As a consequence of this operation, the logic switch 28 operates to hold at its output the last piece of digital information at termination of the last shift pulse. The significance of this operational characteristic is that the output of the FLIP-FLOP 28 does not change during recirculation of data from the output of register 25 to its input by the load (not the shift) clock pulses. For all practical purposes, therefore, the unit under test (at least in a static testing mode) sees a repetition of the bit pattern without any "gaps."

Data at the output of the logic switch 28 appears at one of the inputs to the AND gate D1(D=DRIVE). If a drive output command has been issued, the other input to this gate will be active, and the last data at the output of the register 25 will be present at the gate output. This data then advances to the level translator 30 for that particular test point.

Operation of the digital word generator as a checking device in the receive mode is similar. In this case, of course, data expected to be received will be contained in register 25. Incoming data in the receive mode appears at the logic comparator 42 in the form of one of two signals satisfying a level condition. If an incoming level less than a maximum voltage level is sought, then an incoming pulse meeting the low level requirement will generate a 1 on the $V_L$ line entering AND gate LGC2 (LGC=LOGIC COMPARISON) of the comparator 42. Likewise, if the incoming signal meets the requirement for a minimum higher voltage level, a 1 will appear on the $V_H$ input line to the gate LGC1.

Errors are sampled and stored as follows. The device 16 is in the receive mode, the output of the "SET RECR" FLIP-FLOP 55 will be high and all of the input gates L3, S2, L6 and R1 will be enabled to receive strobe pulses (developed from the shift pulses) to shift data through the register 27. Data (inverted) from the register 25 feeds the other input to the gates LGC1 and LGC2 of the logic comparator 42. If at the time of occurence of a strobe pulse, the data received on one of the lines $V_H$ and $V_L$ is not identical to data which is expected, an error pulse is generated on the comparator output conductor 68.

Any error, that is, an error pulse, at the output conductor 68 therefore is loaded into register 27 and simultaneously sets the FLIP-FLOP 70. Once this FLIP-FLOP has received any error indication, its output Q remains active and induces an error flag signal at the output of the error gate 73.

Incoming data may be expected to be delayed by a certain amount relative to the clocking of data applied to test points. For this reason, the shift pulses used to clock data out of the storage register 25 are delayed a small amount to compensate for a minimum delay needed for data to appear at the output of the logic comparator 42. To this end, delayed shift pulses are applied to the input 75 of the AND gate S–2 of the data and logic section 57B. The clock pulses on the conductor 65 therefore will lag somewhat behind the shift pulses used to apply data to other channels of the device 16 which are in the "drive" mode.

When data is written into the error register, in other words, loaded into the register, it is important that error bits are not unnecessarily indicated. It sometimes occurs, for example, that the incoming signal is delayed substantially from the point of application of the applied signal producing an output on the UUT. It is therefore desirable that the signal at the output of the logic comparator 42 be sampled at some time which is fairly representative of the actual time an output from the UUT can be expected. The strobe pulses applied to the gate R1 at 77 are accordingly variable in time and may be adjusted over a substantial range by means of a variable delay line associated with the PSG 22. This gate R1 is enabled only in the receive mode, to provide strobe pulses on the output conductor 79.

In order to be able to read the contents of the second register 27, it is of course necessary to be able to move the error pattern forward so that any generated error bits will appear in the proper relative position within the register. This requirement is similar to the requirement for loading information into the register 25. In the case of the error register 27, however, filling the register occurs by the feeding of load clock pulses onto the input conductor 80 to the AND gate L6.

The output of the error register 27 appears on conductor 82, so that any errors appearing in any bit position may be read out of the register 27 upon suitable command, which places read clock pulses on the input conductor 83 leading to the AND gate L7.

It should be noted, that, with respect to operation of the system in the drive mode, shift pulses to the input 63 of the logic section 57B cease whenever the maximum number of bits have been clocked. Thereafter, load pulses appear at, for example, the input conductor 59 so that data within the register 25 will be recirculated, while retaining the last output of the register 25 at the output of the logic FLIP-FLOP 28. With respect to the receive mode, data is moved to the read-out position through the register 25, and through the error register 27 to prepare for receipt of the next pulse train, by pulses on the input line 80. Since the gate L7 is enabled only by the address line and the read pulses, the error register may be read out even though neither the drive mode nor the receive mode have been commanded.

LEVEL SELECTION

FIG. 4 illustrates the electronic circuitry for comparing the incoming signal against minimum and maximum voltage levels for the 0 and 1 logic levels. This figure also illustrates the level translating and driver circuitry for applying the digital bit pattern to the test point or, if the system does not use the switching system 17, then directly to the pin for the UUT.

Considering first the circuits which are operable during the drive mode, the digital bit pattern gated onto the conductor 66 enters the level translator 30 which comprises what is known in the art as a "level shifter." This device establishes the lower logic level in accordance with the variable voltage $V_0$ applied to the control level input 90 of the level translator. The output 91 of the level translator is connected to the limiter/driver unit 31 which sets the upper, logic level $V_1$ by means of a variable voltage obtained from the programmable power supply and injected on the control line 93. The two units 30, 31 operating in conjunction with each other therefore establish the upper and lower signal levels for the digital bit pattern which is to be applied to the closed contacts of K1 when the DWG/DWR is in the drive mode.

In the receive mode, again referring to FIG. 4, the incoming signal on the conductor 35 passes through the closed contacts of the relay K2, through the attenuator circuit 95 and then into the buffer amplifier 97. The attenuator 95 ensures that incoming signal levels up to the maximum obtainable will never exceed the safe voltage for the analytical circuitry. The output of the buffer travels through another adjustable attenuator 98 and then into the oppositely polarized inputs of two comparator amplifiers 99 and 100. Each of these amplifiers is operable to compare the input level against a fixed level $V_{UL}$ and $V_{LL}$, respectively which are set up by the programmable power supply (c15 in FIGS. 1 and 2). As earlier explained, as long as the incoming digital bit pattern from the attenuator 98 in the comparator 39 exceeds a voltage proportional to the threshold voltage $V_{UL}$, the comparator amplifier 99 will produce an output $V_H$. Conversely, if the signal at the output of the attenuator 98 falls below a level which is proportional to the programmable level $V_{LL}$, then the comparator amplifier 100 provides an output $V_L$ . It is apparent that in all normal conditions, only one of the amplifiers 99, 100 will have a high, or true, output at any particular instant of time.

DATA AND CONTROL LOGIC

FIG. 5 depicts the basic operational elements of the data and control logic section 24 by which the various pulses and control functions for the driver and receiver are obtained. All circuits illustrated diagramatically may be considered part of what could be called a subcontroller which operates in conjunction with the device controller, the elements of which have not been shown for purposes of simplicity. To aid explanation, however, it may be assumed that the signals entering or leaving the diagram on the left-hand side (except for signals coming from the programmable signal generator) communicate with the I/O bus of the digital computer. This bus, in the case of the "INTERDATAR 4," includes a number of conductors (e.g., eight conductors) by which data is given by the computer I/O bus to peripheral devices hooked up to the computer and also by which data is delivered from such peripheral devices to the computer. The computer, of course, also issues commands and these may appear on separate command lines or may appear on data lines and decoded by the device controller to produce separate signals for operating peripheral devices.

For purpose of explaining operation of the present invention, it will be assumed that data enters the DWG/DWR over data available lines (DAL) and that it leaves the device over data receive lines (DRL), the former accepting data from the computer and the atter delivering data to the computer when called for. Finally, it will also be assumed that the computer issues commands over a separate set of command conductors and that these are decoded by the device controller for developing particular commands for performing functions including the transfer and receipt of data and the initiation of certain operations.

Referring specifically to FIG. 5, all internal commands for the DWG/DWR are generated in the output command decoder 105 which receives commands from the computer via the device controller (not shown) whenever the command line CMDO is high. Incoming data on the DAL data bus 106 then enters the decoder 105 in the form of a digitally coded command. This results in one of several internal commands issuing from the output of the decoder 105. These commands are as follows: READ, WRITE, RESET, FILL, CYCLE, OC DRIVER, OC RECEIVER, SET INDEX REGISTER, CLEAR ERROR and START.

As shown, most of these internal commands are directed to the control logic unit 108. The OC RECR and OC DRVR, as well as the CLEAR ERROR appearing at the conductors 109, 110 and 111 are directed to elements shown on FIG. 3.

Address data needed to designate the driver and receiver channels which are to become active, i.e., connected to selected pins or test points, also appears on the DAL bus 106 when the incoming DAO line 113 to the address latches 115 is activated. When this occurs, the address for the particular pin or test point that is being addressed is stored ("latched in") until written over by new data. Address information is further defined in the address decoder 116 which includes a major group address section 116*a* and a subgroup section 116*b*. In terms of practical application, the group address may designate one of eight printed circuit boards each containing driver and receiving channels for driving 16 test points, and the subgroup address would then designate a particular test point within that printed circuit card. The address data trunks 117 and 118 exiting from the output of the address decoder 116 therefore feed the printed circuit cards, and include conductors such as 117*a* and 118*a* which activate the address gate 50 shown in FIG. 3.

The control logic unit 108 also produces three signals used to control directly certain aspects of the operation of the receiver and driver channels. These signals are the RESET signal on the conductor 120, the WRITE OR FILL signal on the conductor 25b and the ENABLE OR RESET signal on the conductor 121 leading to the gate 51 (FIG. 3). This latter signal is developed in order that the FLIP-FLOPS 54, 55 can be either set or reset upon receiving this command and being simultaneously addressed.

In addition to providing certain signals directly to the driver and receiver channels for performing simple gating functions, the control logic 108 also produces certain gating signals to a load clock gate control device 125. These signals are the WRITE CONTROL, FILL CONTROL, CYCLE CONTROL and INDEX REG. CONTROL signals. The clock gate control unit 125 performs the important function of operating a gated clock 126, running at a fixed frequency of 2 MHz, and of selectively providing the gated clock pulses outputed on the conductor 128 to all the driver and receiver channels via the conductors 58, 59, 80 and 83 (FIG. 3). The clock gate control unit 125 exercises start/stop control over the clock by means of the connection 129. During a WRITE, FILL or CYCLE operation, therefore, the gated clock 126 will be directed by a control signal on the conductor 129 to run, and the clock gate control will establish simultaneously a path for placing the load clock pulses on one of the outputs 130–132. Load clock pulses accordingly are routed to the various circuit boards via the appropriate conductors, depending upon which of the output conductors 130, 131 and 132 are active.

It was earlier explained that when the number of data bits entered into the register 25 is less than the bit capacity of the register, it is necessary to move the data forward, so that when the START command is issued, data from all the registers associated with the addressed pins exits simultaneously and in synchronism. If the register 25 has a capacity of, for example, 1,024 and only 32 bits (4 bytes) are entered into the register, the 32 bits of data must be moved forward 992 stages. This is accomplished, as earlier noted, by applying pulses from the clock gate control output 132 to the LD CLK & FILL DRV line 59 (FIG. 3). Specifically, 992 pulses must be generated to advance the data the required amount in the data registers.

In a similar manner, any error data stored in the register 27 can be shifted forward before being read out, and this is accomplished by the application of load clock pulses to the LD CLK & FILL RECR line 80 (FIG. 3). The gated clock 126 continues to emit pulses on the line 138 (which appear on the gated outputs 130–132) until it is commanded to stop by an appropriate signal on the control line 129 as developed by the clock gate control 125.

In FIG. 5, the FILL and CYCLE commands are shown as separate signals. A FILL command occurs when data is to be moved from its initial position in the register 25 to the right-most position prior to applying the bit pattern to the output of the DWG/DWR. Once data has been written to this register and it is filled, however, the data bit pattern recirculates and thus again moves to its initial position. In order to move this data forward again, should it be desired to rerun the sam bit pattern, a CYCLE command is issued. This results in a LD CLK & FILL command at the output conductor 132 from the control device 125, just as in the case of a FILL command, the difference being that in this case no data present on the input line 25*b* is entered in the register.

During initial loading of the register, a WRITE command occurs, previous to which a byte count will have been stored in the output command decoder unit from data provided on the DAL bus 106. A different byte count may be used for the receive mode, if desired. These counts tell the DWG/DWR the maximum number of bytes (and therefore the maximum number of bits) that will be entered in any of the registers in the drive or receive modes. Generation of the WRITE CONTROL signal therefore results in the gated clock 126 being turned on and run for a number of counts corresponding to the stored byte count. This byte count is also transferred via the WRITE CONTROL command to the clock gate control 125.

During the writing ("WRITE") of data, any data on the computer DAL bus represents the bit pattern which is to be written into the register 25 and, for each byte of incoming information, a signal appears on DAO line 113. This DAO signal also is routed to the clock gate control 125 to decrement the byte count. For each byte of incoming data during a WRITE command, the clock gate control turns the gated clock on for 8 counts.

In order to keep track of the position of the bit pattern written into the register 25, a pair of index registers 135, 136 is employed. Each of these registers is made up of a number of stages equal to the number of stages in the register 25 and contains a movable marker bit located at a position within the index register that indicates the position of the forward-most bit of the pattern stored in the register 25. If the register 25 is used in the drive mode, then the marker bit is placed in the index register 135; if the unit is in the receive mode, the marker bit in the index register 136 would indicate the data position.

During the initial writing of information to the local multibit register 25, an INDEX REG. CONTROL command is fed to the clock 126 and the opening of the gate to provide clock pulses on the conductor 130. The load clock pulses also are fed to the index registers 135, 136 to move the marker bits in these registers by an amount equal to the number of load clock pulses generated and therefore indicating the position of the forward-most bit written into the local register. The index register marker bits are put into the register by the index register control unit 138 which places a single bit in the rear-most position of the register. This operation occurs under control of the SET INDEX REG. control on the conductor 140 from the command decoder 105.

During the FILL and CYCLE operations, the marker bits in the index registers 135, 136 will be moved forward due to the application of gated clock pulses to these registers. The registers sense when the marker bit reaches the forward-most position and therefore provide a STOP command on the line 141 to the index register control 138. This produces a signal on the connection 143 between the index register control 138 and the clock gate control 125 and causes the gated clock pulses to stop when operating in the FILL and CYCLE modes.

SHIFT pulses, which are variable in rate of repetition, are derived from the programable signal generator are applied to a start/stop control gate 150. These same pulses also are routed to a programable delay line 151, which may be part of the programable signal generator and produces shift pulses (DLY CLK) on the conductor 153. Similarly, STROBE pulses are provided via the conductor 155 to the start/stop control gate. When the digital computer orders the DWG/DWR device to START, the start/stop control gate 150 is activated, allowing SHIFT DELATED CLK and STROBE pulses at the selected frequency to activate the lines 63, 75 and 77.

Any error data stored in the register 27 may be extracted under control of SHIFT pulses from the gated load clock 126. In order to effect this operation, the READ output command is used to open the gate 125. If the computer then calls for data, a signal on the DRO line 145 causes a START command to issue over control line 129 to the gated clock and data is read for a number of counts corresponding to the number of bits of information originally written into the register 25. In other words, the READ operation also makes use of the data byte count, reading out 8 bits each time the DRO line is raised.

Data on the DAL bus enters the DWG/DWR through a serial/parallel and parallel/serial converter 160 which converts the incoming parallel data bytes into serial form for transmission to the register 25 via the conductor 60, as shown. Data is extracted from this converter via the DRL bus, which takes out information obtained from the error registers in serial form converted in the unit 160 into parallel form. Data from each of the error registers comes into a multiplexer 162. Group and subgroup address information from the unit 116 opens a signal path from a selected one of the incoming conductors 82 so that any data on it is transferred to the converter 160. Data is thus read into the converter, one channel, or pin, at a time.

Since one byte, or eight load clock pulses, clock the error register each time the DRO line is raised, data pulses from the error register enter the converter in groups of eight bits of information. The DRO line remains high for a period of time which is larger than that necessary to assemble these eight bits of information, and when the DRO signal drops, information is transferred at that time to the computer over the DRL bus.

In cases where long FILL or CYCLE times are required, such as in the case where only a small amount of data is loaded into the register 25, it could happen that the DWG/DWR unit is not prepared to receive the next command from the computer. Thus, if the load clock or the shift clock pulses are being generated and used in the system, an internal operation is under way during which makes it inappropriate to issue a new command before complete execution of the old command. For this reason, a BUSY signal is raised at the gated load clock 126 and at the start/stop control gate 150 whenever these units are outputting pulses. Upon cessation of the BUSY signal, it is then again possible for the computer to communicate with the device 16.

Although the invention has been described with reference to a preferred embodiment, it should be readily apparent that many modifications and variations are possible within the scope of the art. For example, many of the functions which are shown as being developed within certain devices or units might well be generated or developed in other units. A more specific example, there are numerous ways in which the load clock could be gated or controlled to generate a number of pulses corresponding to the maximum byte count. Furthermore, control circuits may assume different, forms where different computers and computer data formats must be accommodated.

Another example of a variation that is possible pertains to the level-setting units depicted in FIG. 4. Whereas it is preferred to develop the two signals $V_H$ and $V_L$ for use in the logic comparators, this function might have been accomplished by adjusting the level of the signal at the output of the register 25.

All such modifications and variations are to be considered included within the scope of the invention as defined in the appended claims.

I claim:

1. A digital word generator for simultaneously producing time sequential bit patterns so as to provide at least two bits of parallel bit information in response to commands from a digital computer and adapted for use in connection therewith, comprising:

at least two output terminals;

at least two multibit local memories connected to the respective output terminals, each thereof being operable independently of the computer for receiving from a source and storing the bits of a digital signal pattern;

a clock source producing a signal having a frequency related to the operation rate of the local memories;

means for applying the clock signal to to said multibit memories to produce the bits of a digital signal pattern in time sequential relation simultaneously at each output terminal; and address means connectable to the computer and responsive to an address signal to render each of the local memories selectively operable in accordance with a parallel-bit word to be generated.

2. The digital word generator of claim 1, wherein the clock source is operable to produce clock signal pulses at variable frequencies in response to a command from the computer.

3. A digital word generator for producing digital bit patterns in response to commands from a digital computer and adapted for use in connection therewith, comprising:

at least one output terminal;

a multibit local memory connected to the output terminal and operable independently of the computer for receiving from the computer and storing the bits of a digital signal pattern;

a clock source producing a signal having a frequency independent of the operational cycle time of the computer;

means for applying the clock signal to the multibit memory to produce the bits of the digital signal pattern at the output terminal in time sequential relation;

logic comparator means connectable to receive a digital signal from an external test point at one input thereto; means coupled to the local memory for applying the output thereof to the logic comparator means, the logic comparator means being operable to produce an error indication upon a discrepancy between the respective digital signals from the local memory and the test point; and an error memory connected to receive and store error indications from the logic comparator means.

4. The digital word generator of claim 3 wherein the error memory comprises a register for sequentially storing the error indications at a rate corresponding to the rate of application of the bits of the digital word pattern from the local memory to the logic comparator means.

5. The digital word generator of claim 4, further comprising:

means for producing a strobe signal for operating the error register at the bit application rate and in time displaced relation to the clock signal thereby to cause to be stored in the error memory only bits present at such displaced time.

6. The digital word generator of claim 5, wherein the time displacement of the strobe signal relative to the clock signal is variable.

7. A digital word generator for producing digital bit patterns in response to commands from a digital computer and adapted for use in connection herewith, comprising:

at least two output terminals;

at least two local multibit memories each comprised of a multistage register for sequentially storing bits of a digital word presented thereto in response to and at a rate determined by a clock signal;

a clock source producing a signal having a frequency independent of the operational cycle time of the computer; and means for applying the clock signal to each of said multistage registers to produce simultaneously at said output terminals the bits of the respective digital signal patterns stored in said registers.

8. The digital word generator of claim 7, wherein the register is operable to circulate the contents thereof, the generator further comprising:

bit storage means connected intermediate the output of the register and the output terminal and separately responsive to the clock signal for providing the stored bit to the output terminal irrespective of the presence of a signal bit at the register output.

9. A digital word generator for producing digital bit patterns in response to commands from a digital computer and adapted for use in connection therewith, comprising:

at least one output terminal;

a multibit local memory connected to the output terminal and operable independently of the computer for receiving from the computer and storing the bits of a digital signal pattern;

a clock source producing a signal having a frequency independent of the operational cycle time of the computer;

means for applying the clock signal to the multibit memory to produce the bits of the digital signal pattern at the output terminal in time sequential relation;

logic comparator means connectable to receive a digital signal from an external test point at one input thereto;

means coupled to the local memory for applying the output thereof to the logic comparator means, the logic comparator means being operable to produce an error indication upon a discrepancy between the respective digital signals from the local memory and the test point; and controllable switch means connected intermediate at least one of said output terminals and the test point, the switch means being responsive to a mode command from the computer for selectively connecting the test point to either the output terminal or the logic comparator.

10. A digital word generator for producing digital bit patterns in response to commands from a digital computer and adapted for use in connection therewith, comprising:

at least one output terminal;

a multibit local memory connected to the output terminal and operable independently of the computer for receiving from the computer and storing the bits of a digital signal pattern;

a clock source producing a signal having a frequency related to the rate of serial production of bits at the output terminal;

means for applying the clock signals to the multibit memory to produce the bits of the digital signal pattern at the output terminal in time sequential relation;

logic comparator means connectable to receive a digital signal from an external test point at one input thereto;

means coupled to the local memory for applying the output thereof to the logic comparator means, the logic comparator means being operable to produce an error indication upon a discrepancy between the respective digital signals from the local memory and the test point; and level sensitive means connected intermediate the test point and the logic comparator means and operable to provide an output signal to the latter only when the amplitude of the signal at the test point is embraced by predetermined amplitude levels.

11. The digital word generator of claim 10, further comprising:

means responsive to a level command from the computer for developing at least one signal representing one of the predetermined amplitude levels, the level sensitive means being responsive to such level representative signal to establish controllably different predetermined levels.

12. A digital word generator for producing digital bit patterns in response to commands from a digital computer and adapted for use in connection therewith, comprising:

at least one output terminal;

a multibit local memory connected to the output terminal and operable independently of the computer for receiving from the computer and storing the bits of a digital signal pattern;

a clock source producing a signal having a frequency related to the rate of production of serial bits at the output terminal;

means for applying the clock signal to the multibit memory to produce the bits of the digital signal pattern at the output terminal in time sequential relation;

means responsive to a level command from the computer for generating a signal representing the desired amplitude level of the desired signals to be applied to the output terminals; and a level shifting circuit receiving the local memory output and responsive to the desired level-representative signal for producing at the output terminal a digital bit pattern having said desired amplitude level.

13. In an automated diagnostic testing system for performing functional and dynamic testing of logic elements in a unit under test, the combination of:

a digital computer providing selected command signals in accordance with a stored program;

means for providing electrical test points for applying signals to and receiving signals from the unit under test;

a digital word generator including plural storage registers for storing available digital bit patterns;

a clock pulse generator for supplying to said storage registers, in response to a computer command, shift pulses to advance the stored digital bit patterns through the stages of the registers so that the bits in each of said patterns appear in mutually time displaced relation at the respective register outputs;

means for applying the digital pattern bits at the register outputs to respective ones of the test points;

a data reception channel associated with each of the storage registers, each reception channel including a comparator circuit having as inputs (a) the output of a respective register and (b) the input to the reception channel to develop an output signal representing discrepancies therebetween, and means responsive to a computer command for selectively connecting the test point to the reception channel input.

14. The diagnostic testing system of claim 13, further comprising:

an error storage register connected to receive the output signal developed by the comparator circuit; and means for applying a strobe signal to the error storage register in timed relationship with the clock pulse signal, thereby to store the comparator circuit output signal present at specific instants of time corresponding to times when a received signal is expected at the test point.

15. The diagnostic testing system of claim 14 further comprising:

means jointly responsive to the signals at the outputs of the comparator circuits connected to respective test points to develop an error indication upon the occurrence of any discrepancy between the expected digital signal patterns and the digital signal patterns actually received at any test point.

16. The diagnostic testing system of claim 13, further comprising:

address control means associated with each of the storage registers to develop a first command signal for enabling the storage registers associated with a test point which are addressed by the computer; and shift control means jointly responsive to the first command signal and to the shift pulses for storing the bits of the available digital bit pattern in the local storage register so addressed.

17. In an automated diagnostic testing system for performing functional and dynamic testing of logic elements in a unit under test, the combination of:

a digital computer providing selected command signals in accordance with a stored program;

means providing electrical test points for applying signals to and receiving signals from the unit under test;

a digital word generator including at least one local storage register for storing available digital bit pattern information;

a clock pulse signal generator for supplying to the storage register shift pulses to advance the stored digital bit pattern through the stages of the register so as to appear in mutually time displaced relation at the register output;

means for controllably operating the local storage register so as to cause data at the output of said register to be recirculated to an input thereof, thereby to cause the stored digital bit pattern to be reentered thereinto in response to shift pulses; and means for applying the digital pattern bits at the register output to one of the test points.

18. The diagnostic testing system of claim 17, wherein the applying means includes:

data bit storage means connected to receive the local storage register output, said bit storage means having a gating input for receiving shift pulses and being operable to provide at an output thereof a digital bit representing the digital signal present at the local storage register output upon receipt of a shift pulse thereby.

19. In an automated diagnostic testing system for performing functional and dynamic testing of logic elements in a unit under test, the combination of:

a digital computer providing selected command signals in accordance with with a stored program;

means providing electrical test points for applying signals to and receiving signals from the unit under test;

a digital word generator including at least one local storage register for storing available digital bit pattern information;

a clock pulse signal generator for supplying to the storage register shift pulses to advance the stored digital bit pattern through the stages of the register so as to appear in mutually time displaced relation at the register output;

means for applying the digital pattern bits at the register output to one of the test points;

an index register having a bit storage capacity corresponding to the bit storage capacity of the local multibit register;

means responsive to a computer command for storing at least one marker bit in the index register; and means responsive to the digital bit pattern received from the computer for locating the marker bit within the index register at a position representing the length of the stored digital bit pattern.

20. The diagnostic testing system of claim 19, further comprising means responsive to a computer command for advancing he stored digntial bit pattern through the local multibit register and for simultaneously advancing the marker bit through the index register; and means responsive to the position for the marker bit for terminating advancement of the digital bit pattern upon arrival of the bits of such pattern at a desired position within the local multibit register.

21. A digital word checking apparatus for receiving and analyzing digital bit patterns and adapted for operation in response to commands from a digital computer, comprising:

a multibit local memory operable independently of the computer for receiving from the computer and storing a digital bit pattern representing data expected to be received;

a clock source producing a signal having a frequency related to the production of serial bit information at the memory output means responsive to a computer command signal for applying the clock source signal to the local memory to produce the bits of the digital pattern at the memory output in time sequential relation;

logic comparator means jointly responsive to the bit pattern at the output of the local memory and the received signal for generating error bit indications upon any discrepancy between the expected and received bit patterns; and an error memory connected to receive and store error indications from the logic comparator means.

22. A digital word checking apparatus for receiving and analyzing digital bit patterns and adpated for operation in responsive to commands from a digital computer, comprising:

plural multibit local memories each operable independently of the computer for receiving from the computer and storing separate digital bit patterns representing data expected to be received, each such memory being separately addressable for the receipt of information from the computer;

a clock source producing a signal having a frequency related to the operation rate of the local memories;

means responsive to the computer command signal for applying the clock source signal to said local memories to produce the bits of each digital pattern at the memory outputs in time sequential relation whereby the simultaneous occurrence of data information bits at the memory outputs may represent plural bits of a parallel-bit word; and logic comparator means jointly responsive to the bit patterns at the outputs of the local memories and the received data for generating error bit indications upon any discrepancy between the expected and received bit patterns.

23. The digital word checking apparatus of claim 22, further comprising:

a second logic comparator means for generating error indications upon any discrepancy between the expected and received bit patterns.

24. The digital word checking apparatus of claim 23, further comprising:

an error storage register for receiving the error indications from each respective logic comparator means at a rate corresponding to the clock source rate.

25. The digital word checking apparatus of claim 24, further comprising:

means for producing a strobe signal for operating the error register at the clock pulse rate and in time displaced relation thereto for storing in the error register only such error indications as may be present at such displaced time.

26. A digital word checking apparatus for receiving and analyzing digital bit patterns and adpated for operation in response to commands from a digital computer, comprising:

a multibit local memory operable independently of the computer for receiving from the computer and storing a digital bit pattern representing data expected to be received;

a clock source producing a signal having a frequency related to the operation rate of the local memories;

means responsive to a computer command signal for applying the clock source signal to the local memory to produce the bits of the digital pattern at the memory output in time sequential relation;

logic comparator means jointly responsive to the bit pattern at the output of the local memory and the received signal for generating error bit indications upon any discrepancy between the expected and received bit patterns;

means responsive to a computer command for generating a level control signal; and level comparator means jointly responsive to the level control signal and to one of the expected and received signals for producing an output signal upon occurrence of those portions of a received signal which corresponds to an expected signal level.

27. The digital word checking appartus of claim 26, wherein:

the level control signal generating means provides separate control signals representing maximum and minimum acceptable levels for the incoming signal; and the level comparator means is operable to generate an output signal representing acceptable signal levels only when the received incoming signal is below and above those maximum and minimum levels, respectively, upon occurrence of a strobe pulse.

28. A digital word checking apparatus for receiving and analyzing digital bit patterns and adapted for operation in response to commands from a digital computer, comprising:

a local multibit memory including a multistage register operable independently of the computer for receiving from the computer and storing a digital bit pattern representing data expected to be received, the register being operable to advance the digital bit pattern therethrough in response to a clock signal;

a clock source producing said clock signal;

means responsive to a computer command signal for applying the clock source signal to the local memory so as to produce the bits of the digital pattern at the memory output in time sequential relation;

logic comparator means jointly responsive to the bit pattern at the output of the local memory and the received signal for generating error bit indications upon any discrepancy between the expected and received bit patterns;

an index register having a bit storage capacity corresponding to the bit storage capacity of the local multibit register;

means responsive to a computer command for storing at least one marker bit in the index register; and means responsive to the digital bit pattern received from the computer for locating the marker bit within the index register at a position representing the length of the stored digital bit pattern.

29. The digital word checking apparatus of claim 28, further comprising:

means responsive to a computer command for advancing the stored digital bit pattern through the local multibit register and for simultaneously advancing the market bit through the index register; and means responsive to the position of the marker bit for terminating advancement of the digital bit pattern upon arrival of the bits of such pattern at a desired position within the local multibit register.

30. The digital word checking apparatus of claim 28, wherein:

the advancing means includes a load clock pulse generator responsive to a computer command for applying data advancing pulses to the index and local multibit registers.

31. A digital word generator and receiver apparatus for producing and receiving digital bit patterns at test points in response to commands from a digital control means, comprising:

a plurality of independently operable local multibit memories having outputs each selectively connectable to separate test points for storing multibit digital patterns;

a clock pulse source connected to said memories so as to clock the bits of said digital pattern in sequence to the memory outputs;

logic compositor means associated with each of said local memories for receiving a digital bit pattern from a test point;

switch means operable in response to a command from the control means for controllably coupling selected ones of the test points to either the local memory or the logic comparator means associated therewith; and means coupling the output of the local memory to the comparator means so as to produce error information at the output of said comparator means representing a discrepancy between the digital pattern received from a connected test point and the local memory.

32. The apparatus of claim 31, further comprising:

an error memory coupled to the output of the logic comparator so as to store error bit information therefrom.

33. The apparatus of claim 32, further comprising:

delay clock pulse means for delaying the application of clock pulses to said local memory when the logic comparator means is coupled to a test point.

34. The apparatus of claim 33, further comprising:

means for varying the amount of delay of said delayed clock pulses from said clock pulses.

* * * * *